United States Patent
Winterrowd et al.

(10) Patent No.: US 10,812,882 B2
(45) Date of Patent: *Oct. 20, 2020

(54) FIXED WIRELESS POINT-TO-POINT MESH ENGINEERED NETWORK DEPLOYMENT FRAMEWORK

(71) Applicant: CenturyLink Intellectual Property LLC, Broomfield, CO (US)

(72) Inventors: Michael P. Winterrowd, Calhoun, LA (US); Michael L. Elford, Calhoun, LA (US); Stephen Opferman, Denver, CO (US); Pasha G. Mohammed, Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,714

(22) Filed: May 15, 2020

(65) Prior Publication Data

US 2020/0280773 A1    Sep. 3, 2020

Related U.S. Application Data

(63) Continuation of application No. 16/219,788, filed on Dec. 13, 2018, now Pat. No. 10,659,853.

(60) Provisional application No. 62/772,509, filed on Nov. 28, 2018.

(51) Int. Cl.
*H04Q 11/00* (2006.01)
*H04W 88/08* (2009.01)
*H04W 88/14* (2009.01)
*H04W 84/18* (2009.01)

(52) U.S. Cl.
CPC ..... *H04Q 11/0071* (2013.01); *H04Q 11/0067* (2013.01); *H04W 88/085* (2013.01); *H04W 88/14* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,983,109 B1 * | 1/2006 | Britz | H04J 14/0227 398/166 |
| 10,659,853 B1 * | 5/2020 | Winterrowd | H04Q 11/0071 |

(Continued)

*Primary Examiner* — David W Lambert

(57) ABSTRACT

Novel tools and techniques for point-to-point network service provisioning and mesh network transitioning are provided. A system includes a fiber injection node, host mesh network radio, and a first node. The first node may comprise a remote wireless transceiver in communication with the host wireless transceiver, a first mesh network node transceiver configured to communicate with other mesh network node transceivers, a processor, and non-transitory computer readable media comprising instructions executable by the processor. The first node may be configured to establish a point-to-point wireless connection to the host wireless transceiver of the fiber injection node, and provision access to the service provider network to the first customer premises. The first node may further be configured to establish a mesh connection to a secondary mesh network node associated with a second customer premises, and provision access to the service provider network to the second customer premises.

20 Claims, 10 Drawing Sheets

(56) References Cited

U.S. PATENT DOCUMENTS

| | | | | |
|---|---|---|---|---|
| 2007/0201540 A1* | 8/2007 | Berkman | ............... | H04B 3/542 375/219 |
| 2015/0207724 A1* | 7/2015 | Choudhury | ............. | H04L 45/42 370/255 |
| 2015/0230275 A1* | 8/2015 | Kerpez | ................ | H04W 28/08 370/329 |
| 2016/0094398 A1* | 3/2016 | Choudhury | ............. | H04L 45/42 370/254 |
| 2018/0343685 A1* | 11/2018 | Hart | ...................... | H04W 24/02 |
| 2019/0349848 A1* | 11/2019 | Bali | ...................... | H04J 3/1652 |

* cited by examiner

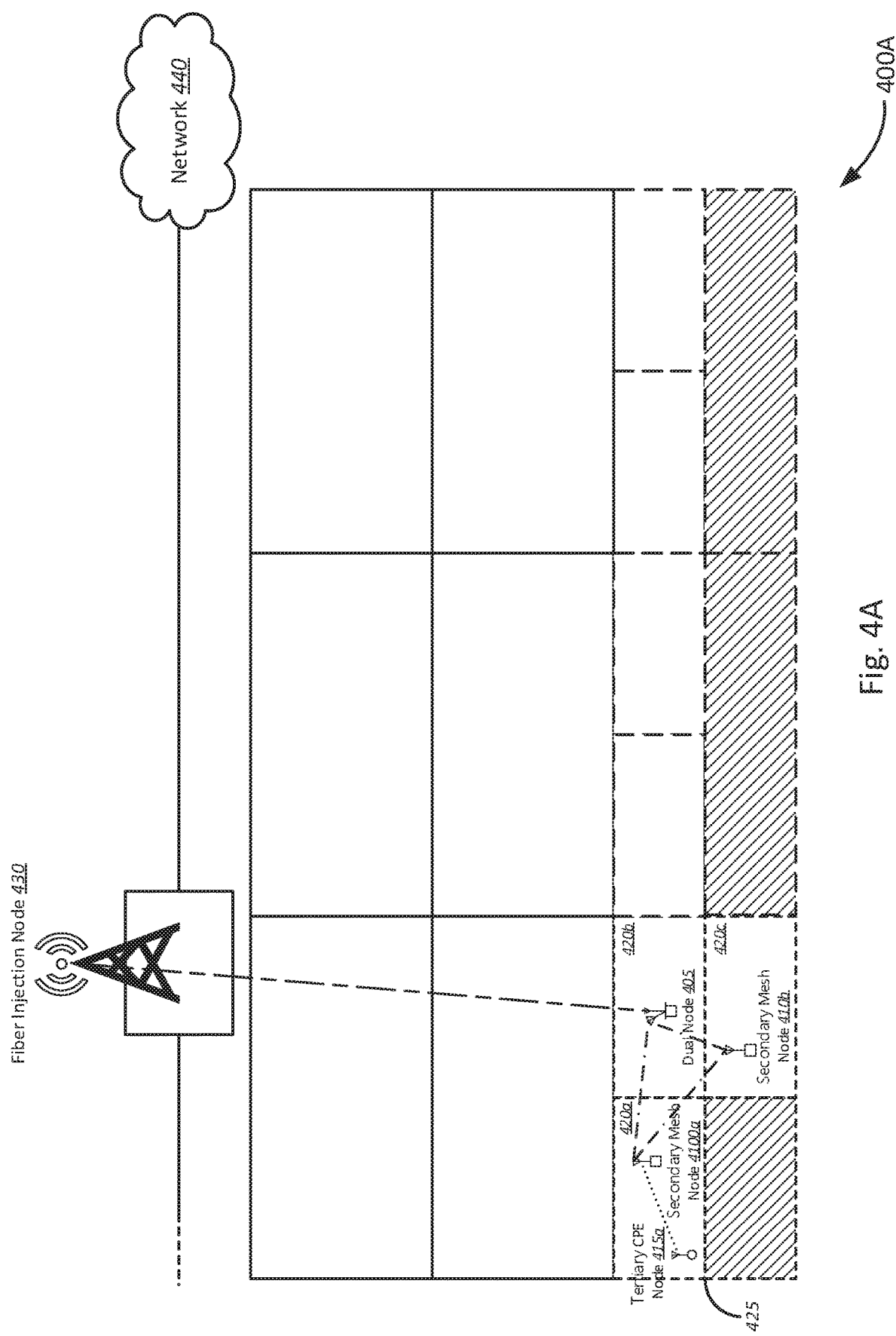

FIXED WIRELESS POINT-TO-POINT MESH ENGINEERED NETWORK DEPLOYMENT FRAMEWORK

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network infrastructure deployment, and more particularly to a point-to-point mesh engineered network deployment framework.

BACKGROUND

Often, conventional methods of provisioning internet service have required traditional internet service providers and other network carriers to lay physical infrastructure, such as fiber optic and copper cable, to a customer premises. With the advent of high bandwidth wireless networking capabilities, wireless (e.g., through wireless access points, 5G cellular networks) high speed internet access is increasingly offered and adopted as an alternative to traditional fiber optic and/or copper cable communication media. As millimeter wave wireless technology has advanced, higher bandwidth and more reliable wireless network services and applications are increasingly available wirelessly, for example through 5G cellular communications.

Accordingly, tools and techniques for are provided for wirelessly provisioning and transitioning high-speed network services.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 4A is a schematic diagram of an initial deployment of the point-to-point mesh network deployment, in accordance with various embodiments;

DETAILED DESCRIPTION OF CERTAIN EMBODIMENTS

Figure 1:
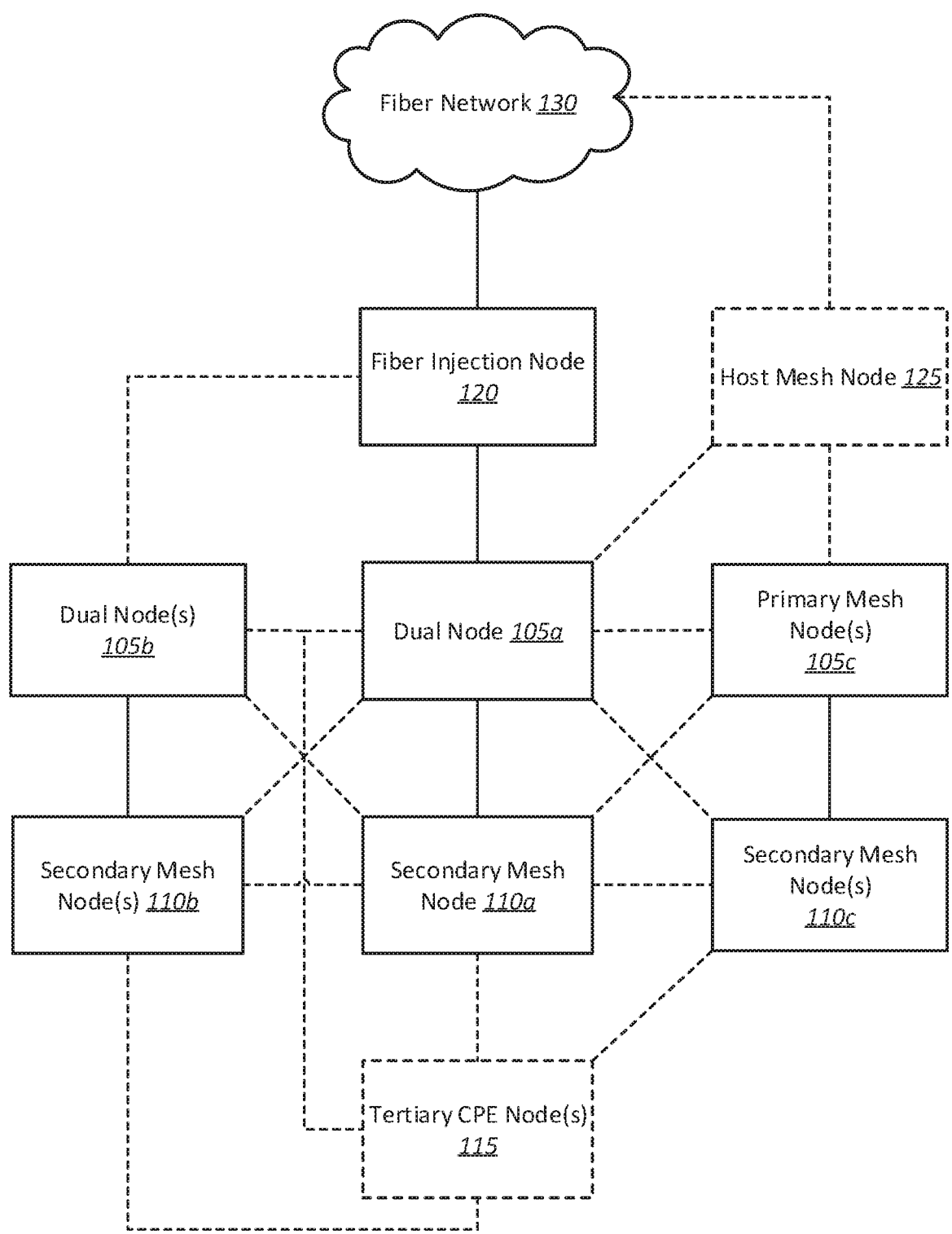
FIG. 1 is a schematic block diagram of an example topology for point-to-point mesh network deployment, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for point-to-point network service provisioning and transitioning is provided. The system may include a fiber injection node, a host mesh network radio, and a first node. The fiber injection node may include a host wireless transceiver and may be coupled to a service provider network. The host mesh network radio may be coupled to the service provider network. The first node may be associated with a first customer premises, and may further include a remote wireless transceiver in communication with the host wireless transceiver. The first node may include a first mesh network node transceiver configured to communicate with other mesh network node transceivers. The first node may further include a processor, and non-transitory computer readable media comprising instructions executable by the processor to establish, via the remote wireless transceiver, a point-to-point wireless connection to the host wireless transceiver of the fiber injection node. The instructions may further be executable to provision, via the point-to-point wireless connection, access to the service provider network to the first customer premises. The processor may further execute the instructions to establish, via the first mesh network node transceiver, a mesh connection to a secondary mesh network node associated with a second customer premises, and provision, via the mesh connection, access to the service provider network to the second customer premises. Thus, the first node may further be configured to receive, via the mesh connection, a first data from the second customer premises, and transmit, via the point-to-point wireless connection, the first data from the second customer premises to the service provider network.

In another aspect, an apparatus for point-to-point network service provisioning and transitioning is provided. The apparatus may include a remote wireless transceiver, a mesh network node transceiver configured to communicate with other mesh network node transceivers, a processor, and non-transitory computer readable media comprising instructions executable by the processor. The instructions may be executed by the processor to establish, via the remote wireless transceiver, a point-to-point wireless connection to a host wireless transceiver in communication with a service provider network, and provision, via the point-to-point wireless connection, access to the service provider network to a first customer premises. The processor may further execute the instructions to establish, via the first mesh network node transceiver, a mesh connection to a secondary mesh network node associated with a second customer premises, and provision, via the mesh connection, access to the service provider network to the second customer premises. The apparatus may, thus, be configured to receive, via the mesh connection, a first data from the second customer premises, and transmit, via the point-to-point wireless connection, the first data from the second customer premises to the service provider network.

In a further aspect, a method for point-to-point network service provisioning and transitioning is provided. The method includes establishing, via a remote wireless transceiver, a point-to-point wireless connection to a host wireless transceiver of a fiber injection node coupled to a service provider network, and provisioning, via the point-to-point wireless connection, access to the service provider network to a first customer premises. The method continues by establishing, via a first mesh network node transceiver, a mesh connection to a secondary mesh network node associated with a second customer premises, and provisioning, via the mesh connection, access to the service provider network to the second customer premises. The method may further include receiving, via the mesh connection, a first data from the second customer premises, and transmitting, via the point-to-point wireless connection, the first data from the second customer premises to the service provider network.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of an example topology of a system 100 for point-to-point mesh network deployment, in accordance with various embodiments. The system 100 includes a first dual node 105a, a second dual node 105b, a primary mesh node 105c, one or more secondary mesh nodes 110a-110c, a tertiary CPE node 115, a fiber injection node 120, a host mesh node 125, and a fiber network 130. It should be noted that the various components of the system 100 are schematically illustrated in FIG. 1, and that modifications to the system 100 may be possible in accordance with various embodiments.

In various embodiments, the first dual node 105a may be coupled to a fiber network 130 via a fiber injection node 120. The first dual node 105a may further be coupled to the second dual node 105b, primary mesh node 105c, a first secondary mesh node 110a. In some embodiments, the first dual node 105a may further be coupled to the host mesh node 125. In some further embodiments, the second secondary mesh node 110b and/or third secondary mesh node 110c may also be coupled to the first dual node 105a. Similarly, each of the first secondary mesh node 110a and second secondary mesh node 110b may be coupled to the second dual node 105b. Each of the first secondary mesh node 110a and third secondary mesh node 110c may be coupled to the primary mesh node 105c. In some further embodiments, a tertiary CPE node 115 may be coupled to one of the secondary mesh nodes 110a-110c. The primary mesh node 105c may be coupled to the host mesh node 125, which may in turn be coupled to the fiber network 130.

In various embodiments, the first dual node 105a may be a network interface device, gateway device, or a combination of different devices. The first dual node 105a may be configured to couple a customer premises to a service provider network, such as fiber network 130. In various embodiments, the dual nodes, such as the first dual node 105a and second dual node 105b, may include two or more types of wireless transceivers. For example, in some embodiments, each of the dual nodes 105a-105c may include a respective point-to-point radio, and a respective mesh radio.

The point-to-point radio may include, for example, a transmitter, receiver, and/or transceiver. The point-to-point radio may further include an antenna, driver circuits, modulators, demodulators, modems, mixers, and other components as known to those in the art, to enable point-to-point radio communications. Point-to-point radio communications may include suitable wireless communication standards and/or protocols. For example, in some embodiments, point-to-point radio communications may include, without limitation, millimeter wave wireless communications, technologies such as 5G cellular communications and 802.11ad, 10-gig point-to-point wireless communications, laser-based line of sight communications, and other high-speed/high-bandwidth wireless communication standards and protocols (such as 802.11ac, 802.11ax, and any other suitable standards defined under the IEEE 802.11 suite of protocols). Although described as point-to-point communications, it is to be understood that in some embodiments, the point-to-point radio may include point-to-multipoint communications, in which a respective channel may be established for each point-to-point connection. Accordingly, in various embodiments, the dual nodes 105a, 150b may serve as remote antennas configured to establish a point-to-point wireless backhaul connection with, for example, the fiber injection node 120.

In various embodiments, the dual nodes 105a, 105b may each further include a respective mesh radio. The mesh radio, like the point-to-point radio, may similarly include, for example, a transmitter, receiver, and/or transceiver. The transmitter, receiver, and/or transceiver may further include an antenna, driver circuits, modulators, demodulators, modems, mixers, and other components as known to those in the art, to enable mesh Wi-Fi and/or mesh wireless radio frequency (RF) communications, including without limitation, microwave and/or millimeter wave communications. Accordingly, the mesh radio may be configured to enable mesh Wi-Fi communications with other mesh radios (e.g., mesh nodes), as known to those in the art, and over one or more mesh radio bands. In some further embodiments, the mesh radio may be a point-to-point radio (including point-to-multipoint radios), comprising one or more wireless transceivers configured to support point-to-point and/or point-to-multipoint communications with one or more secondary mesh nodes 110a-110c, and/or one or more tertiary CPE nodes 115. Thus, in some embodiments, mesh connections between the dual node 105a and one or more other mesh nodes may include one or more respective point-to-point wireless connections to one or more secondary mesh nodes 110a-110c and/or one or more tertiary CPE nodes 115. Accordingly, the mesh connections may include various types of mesh connections, including, without limitation, line of sight (LOS), non-line of sight (nLOS), and near LOS connections.

In various embodiments, the first and second dual nodes 105a, 150b, may further include physical transceivers for converting signals from one communication medium (e.g., point-to-point radio/mesh radio) to a wired medium, such as twisted pair cable, optical fiber, powerline communications (PLC) via appropriate chipsets, line drivers, and line transceivers, and/or to convert between different wireless communication media, such as between point-to-point wireless communications and mesh Wi-Fi, or, for example, between the point-to-point wireless backhaul connection to a different point-to-point wireless channels used by a respective mesh network. It is to be understood that although the dual nodes 105a, 105b are described as including a point-to-point radio transceiver and a mesh radio transceiver, in other embodiments, other types of wireless and physical line transceivers may be utilized.

Accordingly, in various embodiments, the first and second dual nodes 105a, 105b may be configured to establish a backhaul connection to the fiber injection node 120. For example, the respective point-to-point radios of the dual nodes 105a, 105b may be configured to establish a point-to-point wireless backhaul connection to the fiber injection node 120, and through which traffic may be backhauled, for example, via a fiber optic backhaul, to the fiber network 130. Thus, the dual nodes 105a, 105b may be configured to backhaul traffic from a respective customer/customer premises associated with the dual node 105a, 105b, and/or from one or more other subscribers, such as respective customers associated with each of the one or more secondary mesh nodes 110a-110c, and/or a tertiary CPE node 115. For example, each of the dual nodes 105a, 105b may be associated with a respective customer and/or customer premises. Traffic to and from the associated customer and/or customer premises may be transmitted to and from the fiber network 130 via the point-to-point wireless connection to the fiber injection node 120.

In various embodiments, the dual nodes 105a, 105b may further be coupled to the one or more secondary mesh nodes 110a-110c via a respective mesh wireless connection as described above. In various embodiments, each of the secondary mesh nodes 110a-110c may be associated with a respective customer and/or customer premises. Accordingly, each of the secondary mesh nodes 110a-110b may include a respective mesh radio transceiver configured to establish a mesh wireless connection to one or more of the dual nodes 105a, 105b. In some embodiments, the mesh wireless connections may include one or more mesh wireless connections. In some embodiments, mesh wireless connections may include microwave and/or millimeter wave communications, such as, without limitation, communication protocols defined under IEEE 802.11ac, IEEE 802.11ad, IEEE 802.11 ax, and/or any other suitable 802.11xx protocols, and or one or more respective point-to-point mesh connections, as previously described.

Thus, traffic to and from each of the secondary mesh nodes 110a-110c may be transmitted to the fiber network 130 via one or more respective dual nodes 105a, 105b. Accordingly, traffic to and from each of the secondary mesh nodes 110a-110c may further be transmitted, via the point-to-point wireless connection from the respective dual node 105a, 105b to the fiber injection node 120. Thus, the point-to-point connection may be a high-speed/high bandwidth backhaul connection, such as, without limitation, a 10 gbps point-to-point wireless connection. Accordingly, in various embodiments, one or more of the fiber injection node 120, dual node 105a, 105b, and/or the respective secondary mesh nodes 110a-110c may include VLAN controllers and other suitable equipment, and be configured to appropriately direct traffic to and from each of the respective secondary mesh nodes. For example, traffic associated with the first secondary mesh node 110a may be received at the first dual node 105a over the point-to-point wireless connection. The first dual node 105a, accordingly, may be configured to direct VLAN traffic associated with the first secondary mesh node 110a to the secondary mesh node 110c by first converting the traffic, via appropriate physical line transceivers, to be transmitted via the mesh radio, to the first secondary mesh node 110a. In other embodiments, the first secondary mesh node 110a may, instead, be configured to determine traffic to and from an associated VLAN domain.

Similarly, the fiber injection node 120 may be configured to determine one or more VLAN domains associated with a respective dual node 105a, 105b, and a respective set of secondary mesh nodes 110a-110c associated with each dual node 105a, 105b. Thus, traffic to and from the respective VLAN domains may be transmitted to and from the appropriate dual node 105a, 105b. Thus, respective customer domains may be separated using VLAN controllers, which may be located at the fiber injection node 120, dual node 105a, 105b, and/or secondary mesh nodes 110a-110c.

Although three secondary mesh nodes 110a-110c are depicted and described for purposes of explanation, it is to be understood that in other embodiments, more or less secondary mesh nodes may be supported by the system 100, and by each individual dual node 105a, 105b. Moreover, in further embodiments, each of the secondary mesh nodes 110a-110c may be coupled to one or more respective tertiary CPE node 115. Thus, the tertiary CPE node 115 may communicate with the fiber network 130 through respective secondary mesh nodes 110a-110c, which are in turn coupled to a respective dual node 105a, 105b, which is then coupled to the fiber injection node 120 via the point-to-point wireless connection.

In various embodiments, the fiber injection node 120 may include a point-to-point wireless transceiver as described above, with respect the dual nodes 105a, 105b. In various embodiments, the fiber injection node 120 may be coupled to the fiber network 130 via residential developments, neighborhoods, and/or municipalities may be divided into geographic groupings of households (e.g., unique customer premises). In some embodiments, the group of households may be referred to as a cluster. For example, in one embodiment, a cluster may be defined as a grouping of 32 households. When a new customer requests service, it may be determined whether any other customers are in the associated cluster as the new customer. If it is determined that no other customers are present in the cluster, the fiber injection node 120 may be configured to establish a point-to-point wireless connection to the customer requesting the service. Accordingly, in various embodiments, the first new customer requesting service in a respective cluster may be provided with a dual node 105a, 105b (e.g., both a point-to-point wireless transceiver and a mesh radio transceiver) by an Internet service provider to receive service. Thereafter, the fiber injection node 120 may be configured to establish a point-to-point wireless connection to the dual node 105a, 105b. Accordingly, in some examples, only a single respective dual node 105a, 105b may be provided for each cluster.

If it is determined that the customer requesting service is not the first customer of a given cluster, the customer requesting service may be authorized to receive network services via an existing respective dual node 105a, 105b of the cluster associated with the requesting customer. For example, in some embodiments, the customer requesting service (e.g., a subsequent customer) may be a secondary mesh node 110a-110c, which may establish a mesh Wi-Fi connection to a respective existing dual node 105a, 105b. Accordingly, in some embodiments, the secondary mesh node 110a-110c may be configured to establish a mesh wireless connection to the dual node 105a, 105b. The secondary mesh node 110a-110c may include, for example, a wireless router, wireless access point, wireless modem, or other customer premises equipment associated with the subsequent customer requesting service. The secondary mesh node 110a-110c may further be configured to authenticate itself to receive services from the dual node 105a, 105b and/or fiber injection node 120. For example, in some embodiments, the subsequent customer requesting service may be able to authenticate themselves via a respective portal or webpage. In yet further embodiments, authentication and authorization to provision services to a new customer, whether at the dual node 105a, 105b or secondary mesh node 110a-110c may occur at an associated digital subscriber line access multiplexer (DSLAM), optical line termination (OLT), central office, or an authentication server accessible via a wide area network (WAN) and/or the Internet.

In yet further embodiments, a super cluster may be defined as a group of clusters. For example, a super cluster may include 4 clusters each. In some embodiments, in contrast with the examples above, rather than providing the first customer of each customer with a dual node 105a, 105b, the first customer of each super cluster may be provided with a respective dual node 105a, 105b. If it is determined that a new customer requesting service is the first customer in its respective cluster, but not the first customer in its associated super cluster, a high-speed mesh network connection may be established with the respective dual node 105a, 105b of the corresponding super cluster. Accordingly, in some embodiments, each dual node 105a, 105b may be associated with the first customer in a given super cluster, and each secondary mesh node 110a-110c may be associated with a corresponding first customer of a respective cluster of a super cluster subsequent to the first customer of the super cluster. Each secondary mesh node 110a-110c, in turn, may support one or more tertiary CPE nodes 115 associated with subsequent customers within the same cluster. In some embodiments, subsequent customers in the same cluster as the respective dual node 105a, 105b may also be tertiary nodes 115. Tertiary nodes 115 may be coupled to respective secondary mesh nodes 110a-110b and/or dual nodes 105a, 105b, via short-range customer premises equipment (CPE) mesh network connections.

Accordingly, in various embodiments, the point-to-point wireless connection from the fiber injection node 120 to a respective dual node 105a, 105b may be a long-range point-to-point connection. For example, in some embodiments, this may include a focused, narrow-beam wireless backhaul connection, as previously described. In some embodiments, the point-to-point connection may be configured to support bandwidths of 10 gbps. Connections between the dual node 105a, 105b to each of the secondary mesh nodes 110a-110c may include short-range mesh network connections as previously described, including mesh Wi-Fi and/or point-to-point (e.g., point-to-multipoint) mesh network connections. In some embodiments, the short-range mesh network connections to the secondary may node may be configured to support bandwidths of 2.5 gbps, serving as part of the backhaul connection to a respective dual node 105a, 105b. Each of the short-range CPE mesh network connections to one or more respective tertiary nodes 115 may, in turn, be mesh Wi-Fi and/or mesh wireless RF connections, as known to those in the art. In some embodiments, the CPE mesh network connections to respective tertiary CPE nodes 115 may be configured to support bandwidths of 1.5 gbps.

In various embodiments, once a critical mass of households has been provisioned, the system 100 may become self-supportive via mesh network connections. Once the critical mass has been reached, the fiber injection node 120 may, in some examples, be removed and redeployed to a different service area. Thus, in some embodiments, dual nodes 105a, 105b may be converted to primary mesh nodes, such as primary mesh node 105c. In some embodiments, the point-to-point wireless transceivers at the dual nodes 105a, 105b may also be taken down and relocated to a new service area, along with the fiber injection node. Accordingly, in various embodiments, critical mass may be reached when the mesh networks and 2.5 gigabit mesh network links between the dual nodes 105a, 105b, primary mesh nodes 105c, and secondary mesh nodes 110a-110c become self-supportive. In further embodiments, the system may include, in place of the fiber injection node 120, a host mesh node 125. The host mesh node 125 may be installed or otherwise provided by an internet service provider when critical mass has been reached, or in anticipation of critical mass being reached for a given service area. The host mesh node 125, accordingly, may be configured to couple each of the primary mesh nodes 105c (including converted dual nodes 105a, 105b) to the fiber network 130. The host mesh node 125 may include a mesh radio transceiver and be configured to establishing a mesh network backhaul connection, from one or more primary mesh nodes 105a-105c to the fiber network 130, to which the host mesh node 125 may be coupled via an optical transceiver. Accordingly, once the mesh network becomes self-supporting in the corresponding service area, network paths may be established from each of the tertiary nodes, through respective secondary mesh nodes 110a-110c and primary mesh nodes 105a-105c, to the fiber network 130. In yet further embodiments, mesh network connections may be established between primary mesh nodes 105a-105c, between one or more secondary mesh nodes 110a-110c, and between one or more of the tertiary CPE nodes 115. Accordingly, in the event that customers choose to leave the service provider or equipment failure at one or more of the mesh network nodes, alternative paths may be established to allow any one customer to continue receiving service, and additionally the mesh network is configured to not rely on any single customer for connectivity to the fiber network 130 (e.g., via the host mesh node 125). In this way, in various embodiments, once a critical mass of subscribers has been reached, each of the primary mesh nodes (including dual node) 105a-105c, secondary mesh nodes 110a-110c, and tertiary CPE nodes 115 may comprise, without limitation, a self-organizing mesh wireless network configured to establish a mesh wireless backhaul connection to the host mesh node 125.

Figure 2:
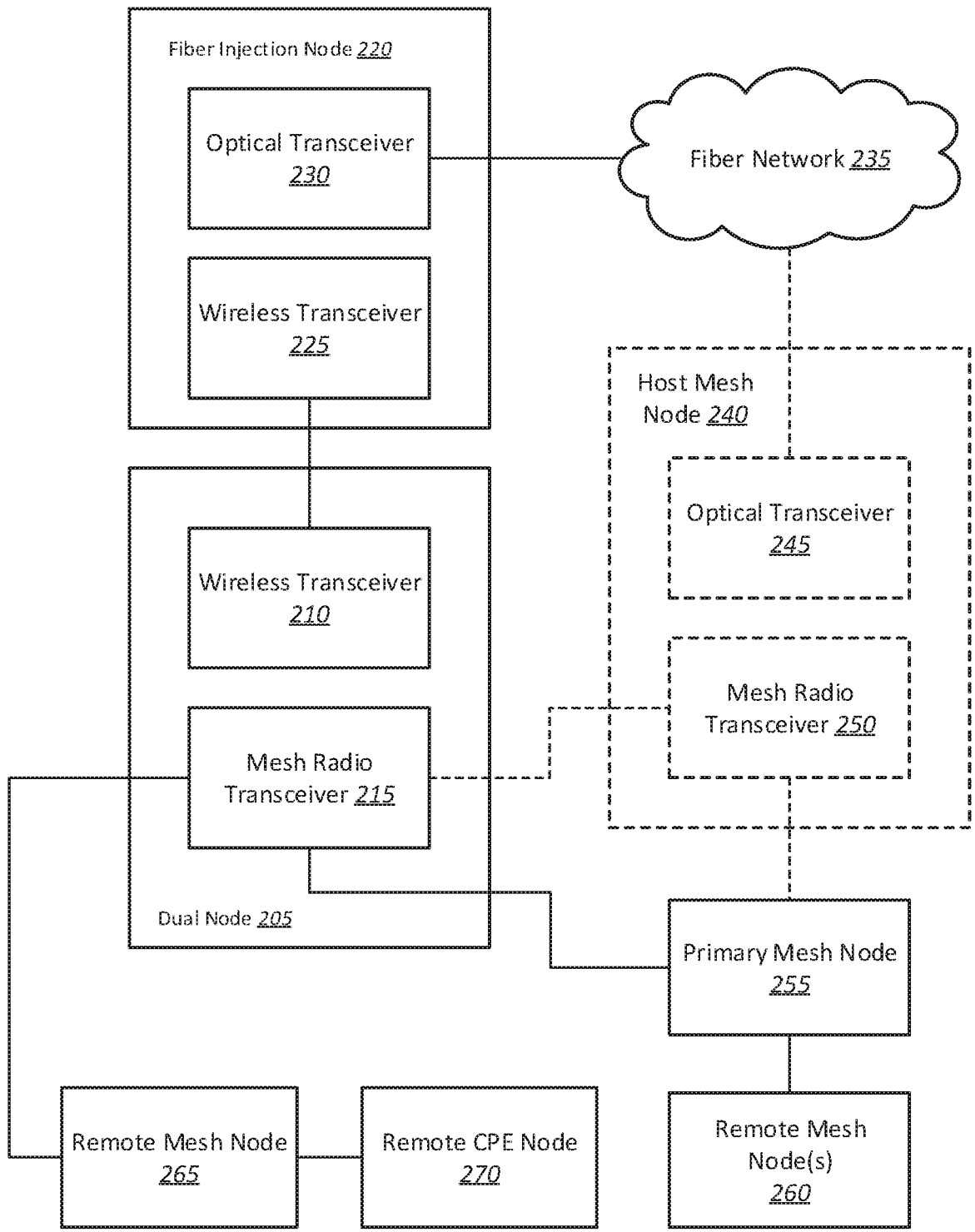
FIG. 2 is a schematic block diagram of a system for point-to-point mesh network deployment, in accordance with various embodiments.

Several of the techniques described above, can be implemented using the system 200 illustrated by FIG. 2. It should be noted, however, that this system 200 can operate differently in other embodiments (including without limitation those described herein) and in other embodiments, a system different from that depicted by FIG. 2 may be utilized. FIG. 2 is a block diagram of one example of a system 200 for point-to-point network mesh deployment, in accordance with various embodiments. The system 200 includes dual node 205, wireless transceiver 210, mesh radio transceiver 215, fiber injection node 220, wireless transceiver 225, optical transceiver 230, fiber network 235, host mesh node 240, optical transceiver 245, mesh radio transceiver 250, primary mesh node 255, one or more remote mesh nodes 260, and remote mesh nodes 265, 270. It should be noted that the various components of the system 200 are schematically illustrated in FIG. 2, and that modifications to the system 200 may be possible in accordance with various embodiments.

In various embodiments, the dual node 205 may include a wireless transceiver 210 and a mesh radio transceiver 215. The fiber injection node 220 includes a wireless transceiver 225 and an optical transceiver 230. The host mesh node 240 may include an optical transceiver 245 and a mesh radio transceiver 250. Each of the primary mesh node 255, one or more remote mesh nodes 260, 265, and remote CPE nodes 270 may each include respective mesh radio transceivers (not shown). In various embodiments, the dual node 205 may be coupled to the fiber injection node 220. The fiber injection node 220 may, in turn, be coupled to fiber network 235. The dual node 205 may further be coupled to one or more mesh nodes, such as remote mesh node 265. The dual node 205 may further be coupled to the primary mesh node 255. The remote mesh node 265 may further be coupled to one or more other mesh nodes, such as remote CPE node 270. The dual node 205 may further be coupled to the host mesh node 240 directly, or in some embodiments, coupled to the host mesh node 240 via the primary mesh node 255. The primary mesh node 255 may be coupled to the host mesh node 240, and further to one or more remote mesh nodes 260.

As previously described with respect to FIG. 1, the dual node 205 may be configured to establish a point-to-point wireless connection to the fiber injection node 220. In various embodiments, the point-to-point wireless connection may be established between the wireless transceiver 210 of the dual node 205 and wireless transceiver 225 of the fiber injection node 220. The dual node 205 may further be configured to establish mesh wireless connections to one or more mesh network nodes, such as primary mesh node 255, and remote mesh node 265. Accordingly, the dual node 205 may be configured to establish mesh wireless connections via the mesh radio transceiver 215, to the primary mesh node 255 and/or remote mesh node 265. It is to be understood that although only a single remote mesh node 265 is depicted, in other embodiments, the dual node 205 may be configured to be coupled to one or more remote mesh nodes 265. In relation to FIG. 1, the remote mesh node 265 may correspond to tertiary CPE nodes (e.g., subsequent customers within the same cluster as the dual node 205). In some embodiments, the remote mesh node 265 may further be coupled to remote CPE node 270 via a mesh wireless connection. In various embodiments, connections to the remote mesh node 265 from the dual node 205, and mesh wireless connections between remote mesh nodes, such as remote mesh node 265 and remote CPE node 270 may correspond to the CPE mesh network connections (e.g., CPE node 270 acting as a wireless access point for the respectively associated customer premises).

In various embodiments, the dual node 205 may further be coupled to a primary mesh node 255. In some embodiments, the primary mesh node 255 may be a dual node that is subsequently converted to become a primary mesh node 255. In other embodiments, the primary mesh node 255 may correspond to the secondary mesh nodes 110a-110c of FIG. 1, in which the primary mesh node 255 is associated with the first customer in a given cluster, but within the same super cluster as the dual node 205. Accordingly, the mesh wireless connection to the primary mesh node 255 may include, for example, and without limitation, a high-speed mesh wireless connection (e.g., a 2.5 gbps mesh wireless connection). The primary mesh node 255 may further be coupled to one or more remote mesh nodes 260.

In various embodiments, the primary mesh node 255 may further be configured to establish a mesh network connection to the host mesh node 240. Accordingly, the mesh radio transceiver 250 of the host mesh node 240 may be communicatively coupled to the primary mesh node 255. The mesh wireless connection to the primary mesh node 255 may be configured as a backhaul connection to the fiber network 235, carrying traffic from, for example, the one or more remote mesh nodes 260, as well as customer traffic from a customer associated with the primary mesh node 255. Accordingly, the host mesh node 240 may further be configured to transmit traffic from various mesh nodes coupled to the host mesh node 240, to the fiber network 235 via the optical transceiver 245. In some embodiments, the optical transceiver 245 may include one or more of optical line drivers, mixers, cross connects, splitters, etc. configured to communicate with the fiber network 235.

In further embodiments, the host mesh node 240 may be coupled to mesh node 205, similar to the primary mesh node 255. Accordingly, the mesh radio transceiver 250 of the host mesh node 240 may be communicatively coupled to the mesh radio transceiver 215 of the dual node 205. Alternatively, the dual node 205 may, in some embodiments, be coupled to the host mesh node 240 via the primary mesh node 255.

Accordingly, in various embodiments, the fiber injection node 220 may be configured to transmit traffic to and from the fiber network 235 via the optical transceiver 230 and to transmit traffic to and from a point-to-point wireless connection via the wireless transceiver 225. Traffic handled by the fiber injection node 220 may include traffic on multiple VLANs, one or more VLANs being associated with a respective customer (e.g., mesh node 255-265, remote CPE node 270, and/or dual node 205). Similarly, the primary mesh node 240 may transmit traffic to and from the fiber network 235 via the optical transceiver 245, and traffic to and from a mesh wireless connection via the mesh radio transceiver 250. Similarly, the host mesh node 240 may be configured to handle traffic for multiple VLANs and multiple mesh nodes. Thus, the fiber injection node 220 and the primary mesh node 240 may be configured to convert traffic received over a wireless connection (e.g., from the point-to-point wireless transceiver 215 and/or mesh radio transceiver 250, respectively) to be transmitted over a fiber optic network, such as fiber network 235, and vice versa, from the fiber network 235 to a respective wireless connection.

Figure 3:
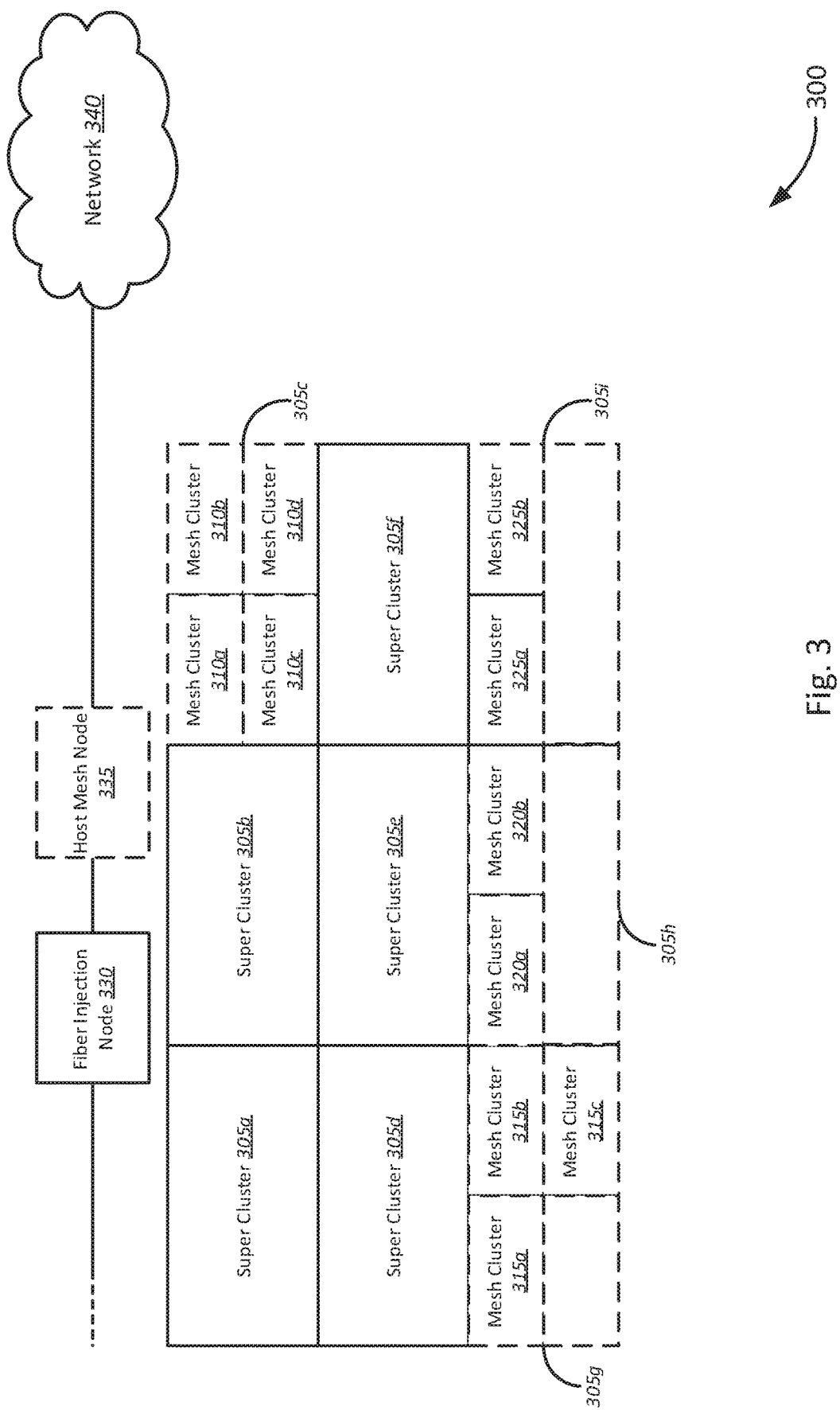
FIG. 3 is a schematic diagram of an example deployment of a system for point-to-point mesh network deployment, in accordance with various embodiments.

FIG. 3 is a schematic diagram of an example deployment of a system 300 for point-to-point mesh network deployment, in accordance with various embodiments. The system 300 includes one or more super clusters 305a-3305i, each super cluster comprising one or more mesh clusters, such as mesh clusters 310a-310d of super cluster 305c, one or more mesh clusters 315a-315c of super cluster 305g, one or more mesh clusters 320a-320b of super cluster 305h, and mesh clusters 325a-325b of mesh cluster 305i. The system 300 further includes fiber injection node 330, host mesh node 335, and network 340. It should be noted that the arrangement and topology of the system 300 are schematically illustrated in FIG. 3, and that modifications to the system 300 may be possible in accordance with various embodiments.

In various embodiments, each of the one or more super clusters 305a-305i may include one or more mesh clusters. For example, super cluster 305c may include four mesh clusters 310a-310c. Each of the mesh clusters 310a-310c may further comprise one or more customers and/or customer premises. Some super clusters, such as super clusters 305g-305i, may include fewer or more mesh clusters. For example, super cluster 305g may include three mesh clusters 315a-315c, and super clusters 305h, 305i may include two mesh clusters respectively, mesh clusters 320a, 320b, and mesh clusters 325a, 325b. Accordingly, in various embodiments, the one or more super clusters 305a-305i, and corresponding mesh clusters may be drawn geographically to divide a given service area. Thus, in some embodiments, the service area may be divided in mesh clusters based on a number of customers and/or customer premises (also referred to as households). Super clusters 305a-305i may then be defined as a grouping of 4 mesh clusters. In other embodiments, a mesh cluster may be defined to cover a distance or range of distances. For example, a mesh cluster may correspond to a maximum distance of 500 ft. In further embodiments, the mesh cluster may be defined to cover a minimum and/or maximum number of customers with a maximum range of 500 ft between any two customers within the mesh cluster. It is to be understood that in other embodiments, other combinations of ranges and number of customers may be utilized.

As previously described with respect to FIGS. 1 & 2, in various embodiments, the fiber injection node 330 may be coupled to a network 340. The network 340 may include, for example, a fiber optic network, such as a passive optical network (PON), or other service provider access networks, a WAN and/or the Internet, or other remote networks. Accordingly, in various embodiments, the fiber injection node 330 may include one or more transceivers configured to communicatively couple the fiber injection node 330 to the network 340. The fiber injection node 330 may further be configured to provision internet service to customers in the service area. Accordingly, in various embodiments, the fiber injection node 330 may be configured to establish one or more point-to-point wireless connections respectively with each super cluster 305a-305i.

As previously described, the fiber injection node 330 may be configured to establish, via a point-to-point radio transceiver, a point-to-point wireless connection to a subscriber (e.g., customer) in each of the super clusters 305a-305i. In some embodiments, for example, a dual node may be associated with each first customer of each respective super cluster 305a-305i. Accordingly, each super cluster 305a-305i may be coupled to the fiber injection node 330. In various embodiments, the initial point-to-point wireless connection to a respective dual node of each of the super clusters 305a-305i may provide a respective backhaul connection to the network 350 for each customer in the super clusters 305a-305i. For example, traffic to and from subsequent subscribers in each of the respective super clusters 305a-305i may be transmitted to the fiber injection node. Thus, each of the super cluster 305a-305i may be provisioned with internet service via the point-to-point wireless connection between a respective dual node and the fiber injection node 330.

In various embodiments, the dual node may further be configured to provision subsequent subscribers within a respective super cluster 305a-305i. For example, as previously described, the dual node may be configured to provision subsequent customers in the same mesh cluster as the dual node, as well as other mesh clusters within the same super cluster. For example, if a dual node is located at the first mesh cluster 310a of super cluster 305c, the dual node may be configured to establish a mesh connection to a secondary mesh node associated with the first customer in a different mesh cluster, such as each of mesh clusters 310b-310d. The connection between the secondary mesh node and the dual node itself may form part of the backhaul connection to the fiber injection node 330. For example, the secondary node of mesh cluster 310b may be configured to transmit traffic to and from a subsequent subscriber within the same mesh cluster 310b. Thus, traffic from a tertiary CPE node (e.g., subsequent customer) may be transmitted, via the secondary mesh node, to the dual node, which then may be carried over the point-to-point wireless backhaul connection to the fiber injection node 330. Accordingly, the secondary mesh node may further be configured to establish one or more respective mesh wireless connections to one or more tertiary CPE nodes.

In various embodiments, as described with respect to FIGS. 1 & 2, In various embodiments, once a critical mass of households has been provisioned, the system 300 may become self-supportive via mesh network connections. Once the critical mass has been reached, the fiber injection node 330 may be removed and redeployed to a different service area, while a host mesh node 335 takes its place. Dual nodes lay be converted to primary mesh nodes, through which various secondary mesh nodes and/or tertiary CPE nodes may be coupled to the host mesh node via a mesh wireless backhaul connection.

Accordingly, in various embodiments, critical mass may be reached when the mesh network established between the various mesh nodes of the service area becomes self-supportive. In various embodiments, once a self-supportive mesh network has been established, the system 300 may transition from connecting to the network 340 via the fiber injection node 330 to establishing a mesh wireless backhaul connection to the host mesh node 335. In various embodiments, the host mesh node 335 may be configured to support one or more backhaul connections to support the number of subscribers in the service area at a given time. For example, in some embodiments, it may be determined, for example at the host mesh node 335, to establish an additional mesh wireless backhaul connection to support the addition of one or more new subscribers. Alternatively, the host mesh node 335 may, in some examples, determine to migrate one or more subscribers to a different backhaul mesh wireless connection.

The host mesh node 335 may be installed or otherwise provided by an internet service provider when critical mass has been reached, or in anticipation of critical mass being reached for a given service area. The host mesh node 335, accordingly, may be configured to couple each of the primary mesh nodes to the fiber network 340 via an optical transceiver. Thus, once a critical mass of subscribers has been reached, each of the primary mesh nodes (including dual node), secondary mesh nodes, and tertiary CPE nodes may comprise, without limitation, a self-organizing mesh wireless network configured to establish one or more mesh wireless backhaul connection to the host mesh node 335.

In some examples, critical mass may be reached when a dual node has been established in each super cluster 305a-305c. In some examples, critical mass may be determined to have been reached when 40% of potential customers in each mesh cluster of each super cluster 305a-305c has been provisioned with network services. It is to be understood that in other embodiments, different algorithms may be utilized to determine whether a critical mass of subscribers has been reached for a given service area.

FIG. 4A is a schematic diagram of an initial deployment of the point-to-point system 400A provisioning a first subscriber and subsequent mesh network growth, in accordance with various embodiments. For example, the system 400A at initial deployment may include a service area, a first super cluster 425, one or more mesh clusters 420a-420c, dual node 405, one or more secondary mesh nodes 410a-410b, and tertiary CPE node 415a.

In various embodiments, a fiber injection node 430 may be deployed to a service area. The service area may, in some examples, lack pre-existing pre-built physical network infrastructure as is conventional. Thus, when a request for service is received or it is otherwise determined to provide service to a service area, a fiber injection node 430 may then be deployed. In some embodiments, deploying the fiber injection node 430 may further include deploying and/or laying a fiber optic backhaul cable and/or network to service the service area. The fiber injection node 430 may then be coupled to the fiber optic backhaul. The fiber injection node 430, for example, may include an aggregator and/or multiplexer, such as a digital subscriber line access multiplexer (DSLAM), optical line termination (OLT), crossovers, switches, hubs, and/or other network aggregator devices.

The first super cluster 425 to be provisioned may include a first mesh cluster 420a, second mesh cluster 420b, and third mesh cluster 420c. A first customer requesting service may be provided with the dual node 405. Accordingly, the fiber injection node 430 may be coupled to the dual node 405. In various embodiments, the fiber injection node 430 may be configured to establish a point-to-point wireless connection, as previously described, to the dual node 405. In some examples, the point-to-point wireless connection may include, without limitation, a line-of-sight, narrow beam, high-bandwidth backhaul connection to the dual node 405. Secondary mesh nodes 410a-410b may be associated with subsequent customers requesting service within the same super cluster 425, but belonging to other mesh clusters 420a, 420c than the mesh cluster 420b of the dual node 405. Accordingly, in various embodiments, the first customer to request service within a mesh cluster, but subsequent to the dual node 405, may be associated with a secondary mesh node 410a, 410b. In various embodiments, each respective secondary mesh node 410a, 410b may be coupled to the dual node 405, via which traffic may be transmitted to and from the fiber injection node 430. In some embodiments, as previously described, the dual node 405 may be configured to establish a mesh wireless backhaul connection to each of the secondary mesh nodes 410a, 410b.

Subsequent customers in each respective mesh cluster 420a, 420c may then be provisioned with network services via respective secondary mesh nodes 410a, 410b. For example, the tertiary CPE node 415a may be coupled to the secondary mesh node 410a. Accordingly, the secondary mesh node 410a may be configured to establish a mesh wireless connection to the tertiary CPE node 415a. The mesh wireless connection to the tertiary CPE node 415a may, as previously described, include a CPE mesh network connection. In some embodiments, the CPE mesh network connection may be configured to support one or more customers' network services. Accordingly, for single customers, the CPE mesh network connection may be provisioned to have a speed and/or bandwidth to support the single customer's network services. In other embodiments, the tertiary CPE node 415a may further support other tertiary nodes. In such arrangements, the CPE mesh network connection to the secondary mesh node 410a may be configured to support the provisioning of network services for the one or more additional customers coupled to the tertiary CPE node 415a.

Accordingly, in the various embodiments illustrated in FIGS. 4A-4D, the point-to-point wireless connections to the fiber injection node are depicted as an alternating long-short dashed line. The mesh wireless backhaul connections are depicted as dash-dot lines, and CPE mesh network connections to individual subscribers (e.g., tertiary CPE nodes) are depicted as a dotted line.

Figure 4B:
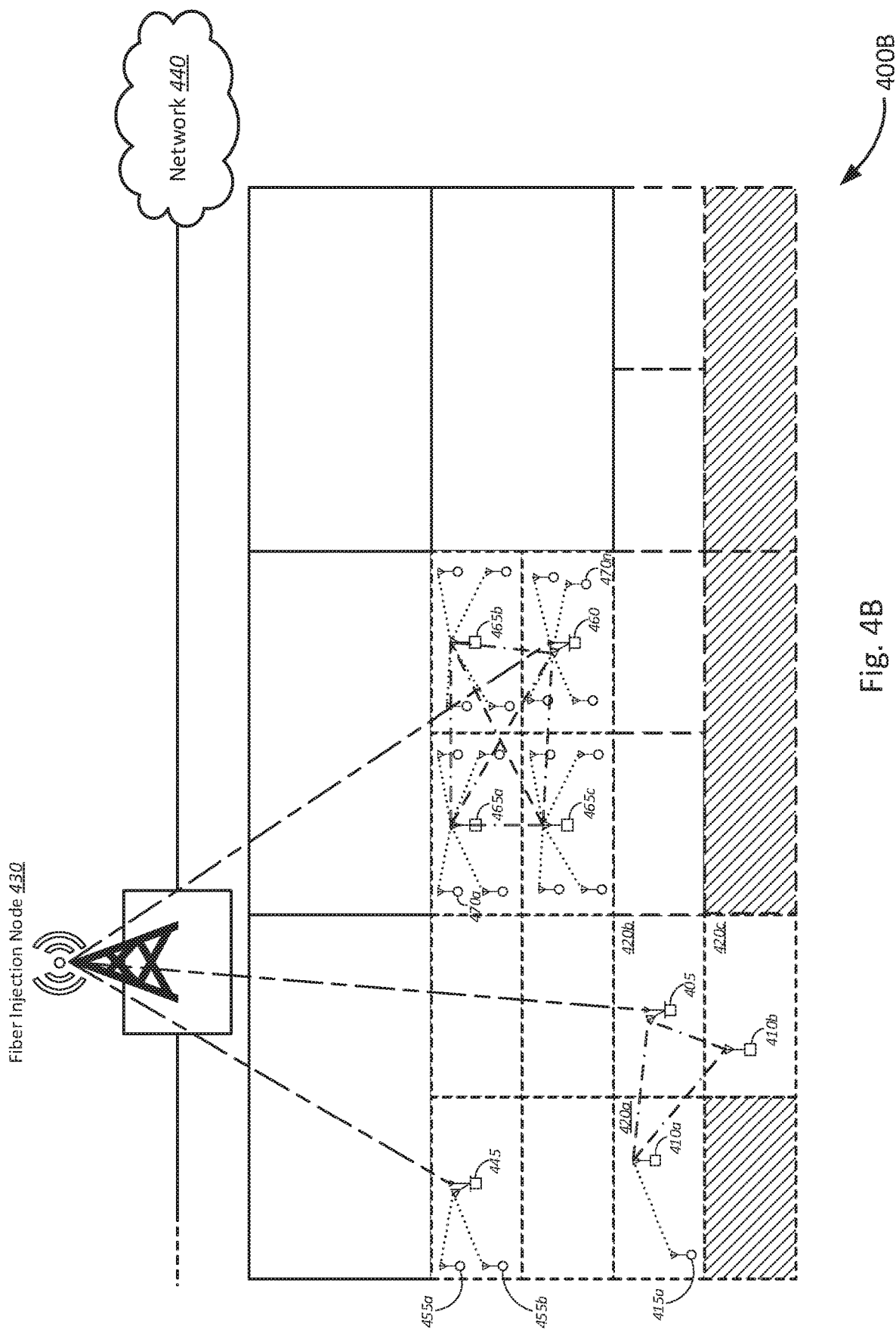
FIG. 4B is a schematic diagram of the point-to-point mesh network infrastructure deployment to additional subscribers with the point-to-point mesh network deployment system and subsequent mesh network growth, in accordance with various embodiments.

FIG. 4B is a schematic diagram of the point-to-point system 400B provisioning additional subscribers with point-to-point infrastructure and subsequent mesh network growth, in accordance with various embodiments. As depicted in FIG. 4B, the system 400B now includes additional subscribers in additional super clusters. For example, the system 400B may include additional dual nodes 445, 460. The dual node 445 may be configured to establish a point-to-point wireless backhaul connection to the fiber injection node 430, and to be coupled to customers within the same mesh cluster via a CPE mesh network connection. For example, mesh nodes 455a, 455b may be coupled to the dual node via a CPE mesh network connection. Accordingly, subsequent customers within the same mesh cluster as the dual node may be provisioned with service via the dual node 445, and over a CPE mesh network connection.

Similarly, dual node 460 may provision internet service to customers in the respective super cluster. In various embodiments, the dual node 460 may be configured to establish a point-to-point wireless backhaul connection to the fiber injection node 430. The dual node 460 may further be configured to establish a mesh wireless backhaul connection to each of the secondary mesh nodes 465a-465c. For example, the dual node 460 may be located at an nth mesh cluster 470n. The dual node 460 may then be configured to establish mesh wireless backhaul connections to each of the first secondary mesh node 465a in the first mesh cluster 470a, second secondary mesh node 465b of the second mesh cluster, and the third secondary mesh node of the third mesh cluster. Each of the secondary mesh network nodes 465a-465c may respectively support one or more tertiary CPE nodes associated with subsequent customers in the respective mesh clusters 470a-470n. Similarly, the dual node 460 may also be configured to support one or more tertiary nodes associated with subsequent customers of the respective mesh cluster of the dual node 460.

Figure 4C:
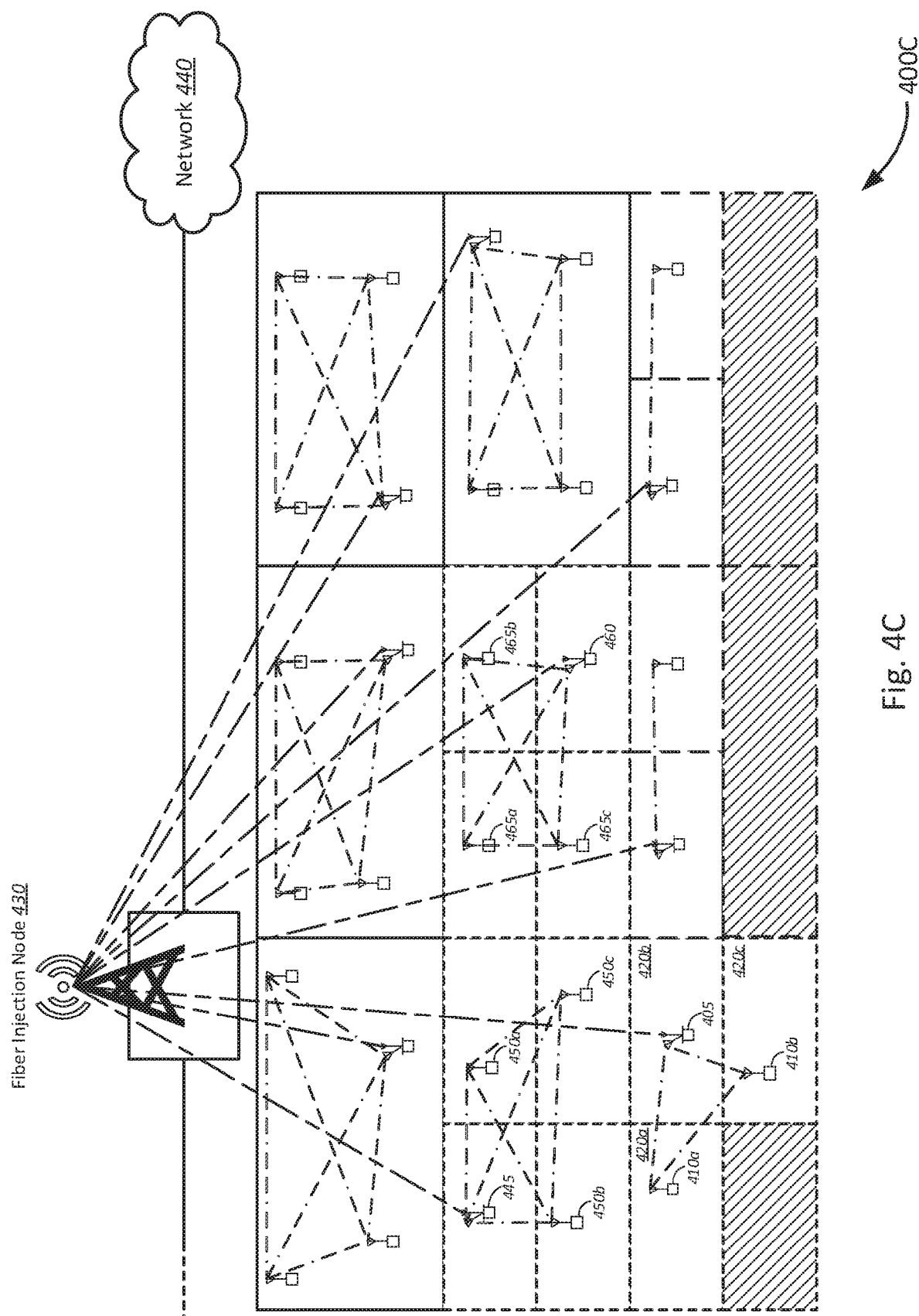
FIG. 4C is a schematic diagram of a full point-to-point deployment of mesh network infrastructure to a respective subscriber in each "super cluster," in accordance with various embodiments.

FIG. 4C is a schematic diagram of a full deployment of the point-to-point network infrastructure in system 400C, wherein service is provisioned to at least one respective subscriber in each "super cluster," in accordance with various embodiments. In a fully deployed configuration, dual nodes may be present in each super cluster of the service area. For example, the system 400C may include dual nodes at each super cluster of the service area, including dual nodes 405, 445, and 460. Each dual node may further be coupled to secondary mesh nodes in each of the mesh clusters of the respective super clusters. Thus, each dual node 405, 445, 460 may be coupled to the fiber injection node 430 via a point-to-point wireless connection. Each dual node, in turn, may be coupled to one or more secondary mesh nodes, including secondary mesh nodes 410a-410b, 450a-450c, 465a-465c, via mesh wireless backhaul connections. Each of the secondary mesh nodes and dual nodes may further be configured to support one or more tertiary nodes (not shown) via respective CPE mesh network connections.

In this way, each mesh cluster may be capable of supporting respective subsequent clusters through respective secondary mesh nodes. Each dual node may, in turn, support each respective super cluster by providing a point-to-point wireless backhaul connection to the fiber injection node 430. In turn, the fiber injection node 430 may be configured to couple customers in the service area to the network 440.

Figure 4D:
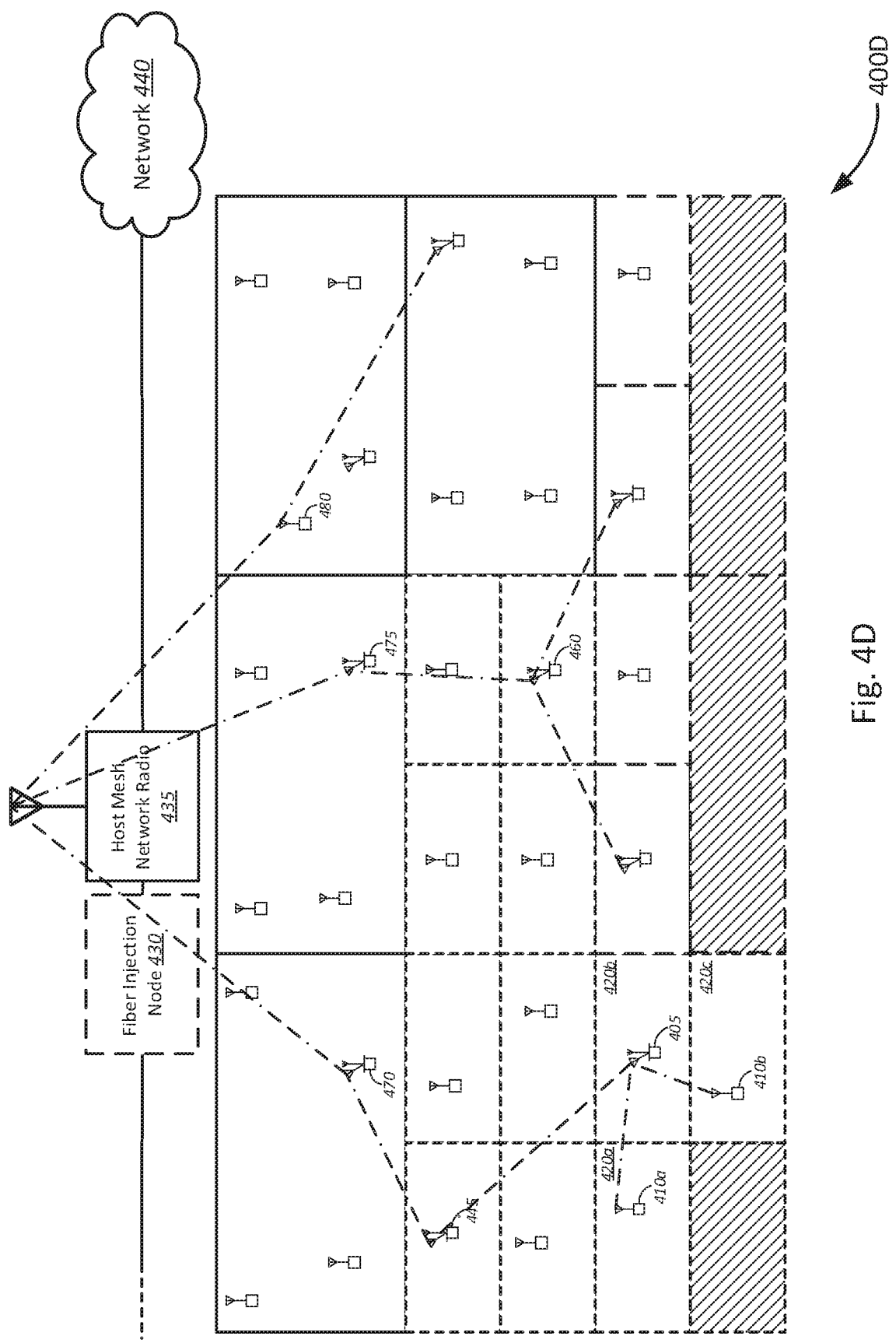
FIG. 4D is a schematic diagram of an optional network transitioning of the point-to-point mesh network deployment, in accordance with various embodiments.

FIG. 4D is a schematic diagram of optional transitioning of the point-to-point wireless deployment to a self-sufficient mesh network system 400D, in accordance with various embodiments. In various embodiments, the mesh network system 400D may include one or more mesh wireless backhaul connections to a host mesh network radio 435 at a host mesh network node (not shown) in addition or instead of the fiber injection node 430.

In various embodiments, one or more mesh wireless backhaul connections may be established to the host mesh network radio 435. For example, in some embodiments, one or more dual nodes may be configured to establish respective wireless backhaul connections to other mesh network nodes, such as other dual nodes and secondary mesh nodes. Similarly, in various embodiments, one or more secondary mesh nodes may be configured to establish respective wireless backhaul connections to other mesh network nodes, such as other secondary mesh nodes and dual nodes. Accordingly, in some embodiments, dual nodes and secondary mesh nodes may be configured to establish one or more mesh network paths back to the host mesh network radio 435. In some embodiments, utilizing network pathing techniques known to those in the art, mesh network paths may be established in an automated, self-organizing manner.

For example, in various embodiments, a first secondary mesh node 410a of the mesh cluster 420a may be coupled to the dual node 405. Similarly, the second secondary mesh node 410b may also be coupled to the dual node 405. The dual node 405 of mesh cluster 420b, in turn, may be coupled to the dual node 445, which in turn may be coupled to the dual node 470. The dual node 470, in turn, may be coupled to the host mesh network radio 435. The dual node 470, accordingly, may also be referred to as a primary mesh node, which may be directly coupled to the host mesh network radio 435. Thus, in some embodiments, mesh network paths may be established based on, for example, a physical proximity to the nearest mesh network node. In further embodiments, factors such as quality of service (QoS), and other performance metrics may be utilized to determine an optimal network path to the host mesh network radio 435. Accordingly, dual node 475 may further be coupled to the host mesh network radio 435, which may in turn be coupled to the dual node 460 of an adjacent super cluster. Dual node 460 may, in turn, be coupled to dual nodes of two neighboring super clusters. In yet further embodiments, the primary mesh node may be a secondary mesh node. For example, secondary mesh node 480 may be physically closest to the host mesh network radio 435. Thus, the secondary mesh node 480 may provide the best quality connection to the host mesh network radio 435. In some embodiments, the secondary mesh node 480 may therefore act as a primary mesh node to the host mesh network radio 435. The secondary mesh node 480 may be coupled, accordingly, to one or more other secondary mesh nodes and/or dual nodes.

Thus, once a critical mass of customers has been provisioned in a given service area, the fiber injection node 430 may be removed and relocated to a new service area. The host mesh network node may, in turn, provide network 440 access to the service area, via the one or more mesh wireless backhaul connections. The host mesh node may be installed or otherwise provided by an internet service provider when critical mass has been reached, or in anticipation of critical mass being reached for a given service area. The host mesh network radio 435 of the host mesh node, accordingly, may be configured to couple each of the primary mesh nodes to the network 440 via an optical transceiver. Thus, once a critical mass of subscribers has been reached, each of the primary mesh nodes (including dual node), secondary mesh nodes, and tertiary CPE nodes may comprise, without limitation, a self-organizing mesh wireless network configured to establish one or more mesh wireless backhaul connection via the host mesh network radio 435.

Figure 5:
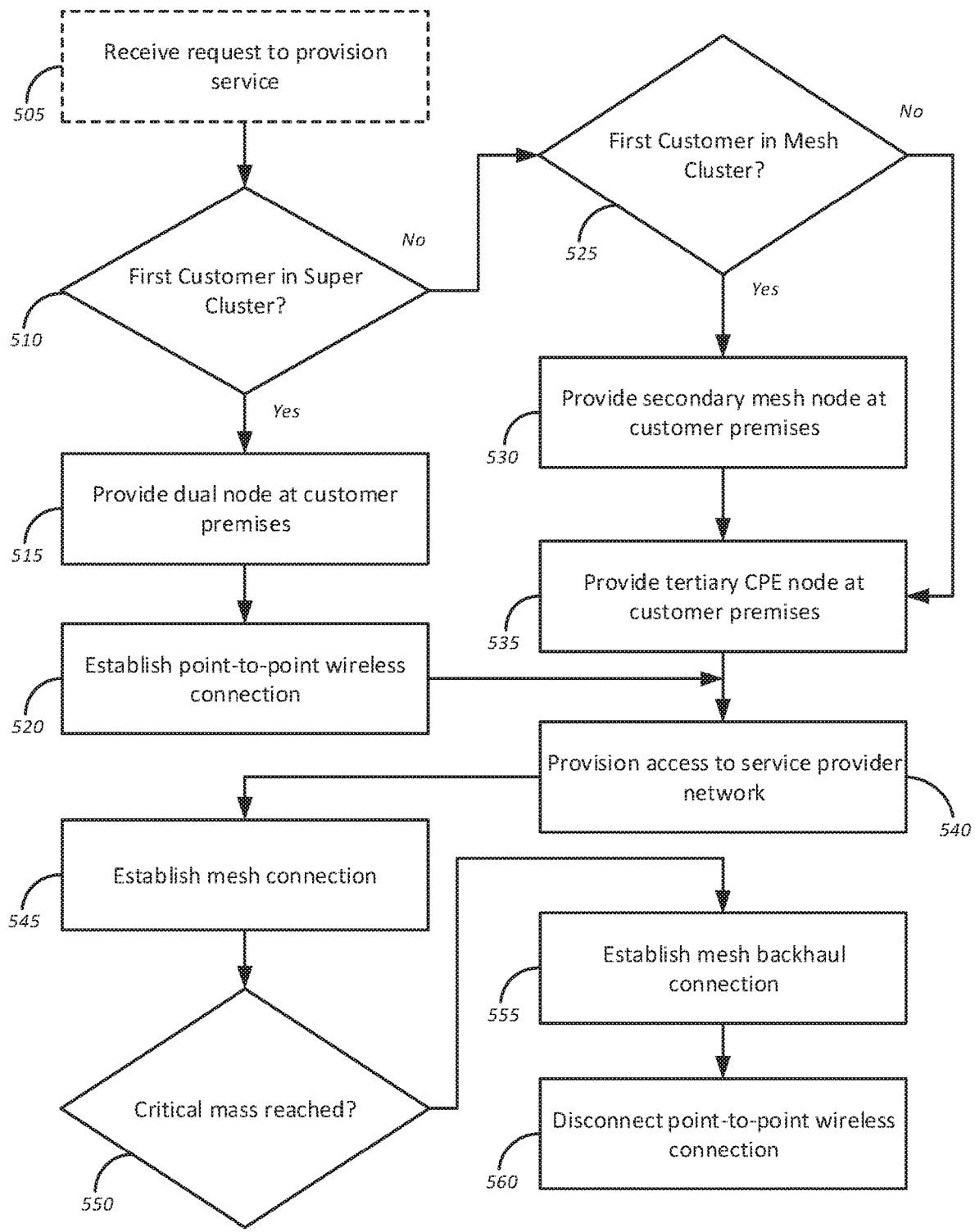
FIG. 5 is a flow diagram of a method for point-to-point mesh network deployment, in accordance with various embodiments.

FIG. 5 is a flow diagram of a method 500 for point-to-point mesh network deployment, in accordance with various embodiments. The method 500 begins, at optional block 505, by receiving a request to provision service. In some embodiments, the request to provision service may be received, for example, via a service provider's service provisioning systems, such as one or more of a customer management system, provisioning servers, and/or authentication and authorization systems.

Once the request has been received, at decision block 510, it may be determined whether the customer requesting service is the first customer in a super cluster. In various embodiments, a customer management system, for example, may be configured to determine whether the customer requesting service is the first customer of the super cluster.

The customer management system may include a customer database, comprising one or more entries indicative of customers in a service area, and corresponding super cluster and/or mesh cluster. Customers may be determined to belong to a super cluster and respective mesh cluster based on various types of location information, including, without limitation, street addresses, physical addresses, and/or geographic location (e.g., geographic coordinates, physical location, etc.).

If it is determined that the customer requesting service is the first customer in a respective super cluster, the method 500 continues, at block 515, by providing a dual node at the requesting customer's customer premises. In various embodiments, the dual node, as previously described, may include a point-to-point wireless transceiver and a mesh wireless transceiver. At block 520, the dual node may, therefore, establish a point-to-point wireless connection to a fiber injection node. As previously described, the fiber injection node may, accordingly, also include a point-to-point wireless transceiver. In various embodiments, the point-to-point wireless connection may be a wireless backhaul connection to the fiber injection node.

If it is determined that the customer requesting service is not the first customer in a respective super cluster, the method 500 continues at decision block 525, by determining whether the customer requesting service is the first customer in a respective mesh cluster. If it is determined that the customer requesting service is the first customer in the respective mesh cluster, the method 500 may continue, at block 530, by providing a secondary mesh node at a customer premises associated with the requesting customer. If it is determined that the customer requesting service is not the first customer in the respective mesh cluster, the method 500 may continue, at block 535, by providing a tertiary CPE node at the respective customer premises. As previously described, the tertiary CPE node may include any suitable mesh network node configured to establish a mesh network connection (e.g., a wireless router, wireless access point, etc.) as known to those in the art.

The method may continue, at block 540, by provisioning access to the service provider network. For example, for the dual node, access to the service provider network may be provisioned directly via the point-to-point wireless connection. For the secondary mesh node, as previously described, the dual node may be configured to establish a mesh wireless backhaul connection to the secondary mesh node. Each tertiary node may, in turn, be coupled to the service provider network and provisioned with access to the service provider network via a CPE mesh link to the secondary mesh node, which may in turn be coupled to the dual node, which is in turn coupled to the fiber injection node, via which the service area is coupled to the service provider network.

At block 545, the method 500 continues, by establishing a mesh connection. The mesh connection may include, for example, a mesh connection from the dual node to one or more secondary mesh nodes, and between each of the one or more secondary mesh nodes and a respective set of one or more tertiary CPE nodes. In various embodiments, the mesh connection between the dual node and the secondary mesh node may include a mesh wireless backhaul connection over which the tertiary CPE nodes may communicate with the service provider network. In yet further embodiments, as previously described, the mesh connection may include one or more respective point-to-point connections in a point-to-multipoint configuration. Thus, mesh connections may include respective point-to-point connections between each of the secondary mesh nodes, dual nodes, and tertiary CPE nodes.

At decision block 550, the method may continue by determining whether a critical mass of customers has been reached. As previously described, a critical mass may be reached when a self-sustaining mesh network has been created between the dual nodes, secondary nodes, and tertiary nodes of a service area. Thus, when a critical mass has been reached, the method 500 may continue by establishing a mesh wireless backhaul connection to a host mesh node in communication with the service provider network. In various embodiments, the host mesh node may include a host mesh radio transceiver in communication with one or more primary mesh nodes. The primary mesh nodes may include mesh nodes directly coupled to the host mesh node. Primary mesh nodes may include, without limitation, one or more dual nodes, one or more secondary mesh nodes, and/or, in some examples, one or more tertiary CPE nodes.

The method 500 may further continue, at block 560, by disconnecting the point-to-point wireless connection. As previously described, in various embodiments, the fiber injection node and point-to-point wireless transceiver of the fiber injection node may be removed and installed at a new location to service a new service area, and the existing service area may rely on the self-sufficient mesh network for connectivity to the service provider network.

Figure 6:
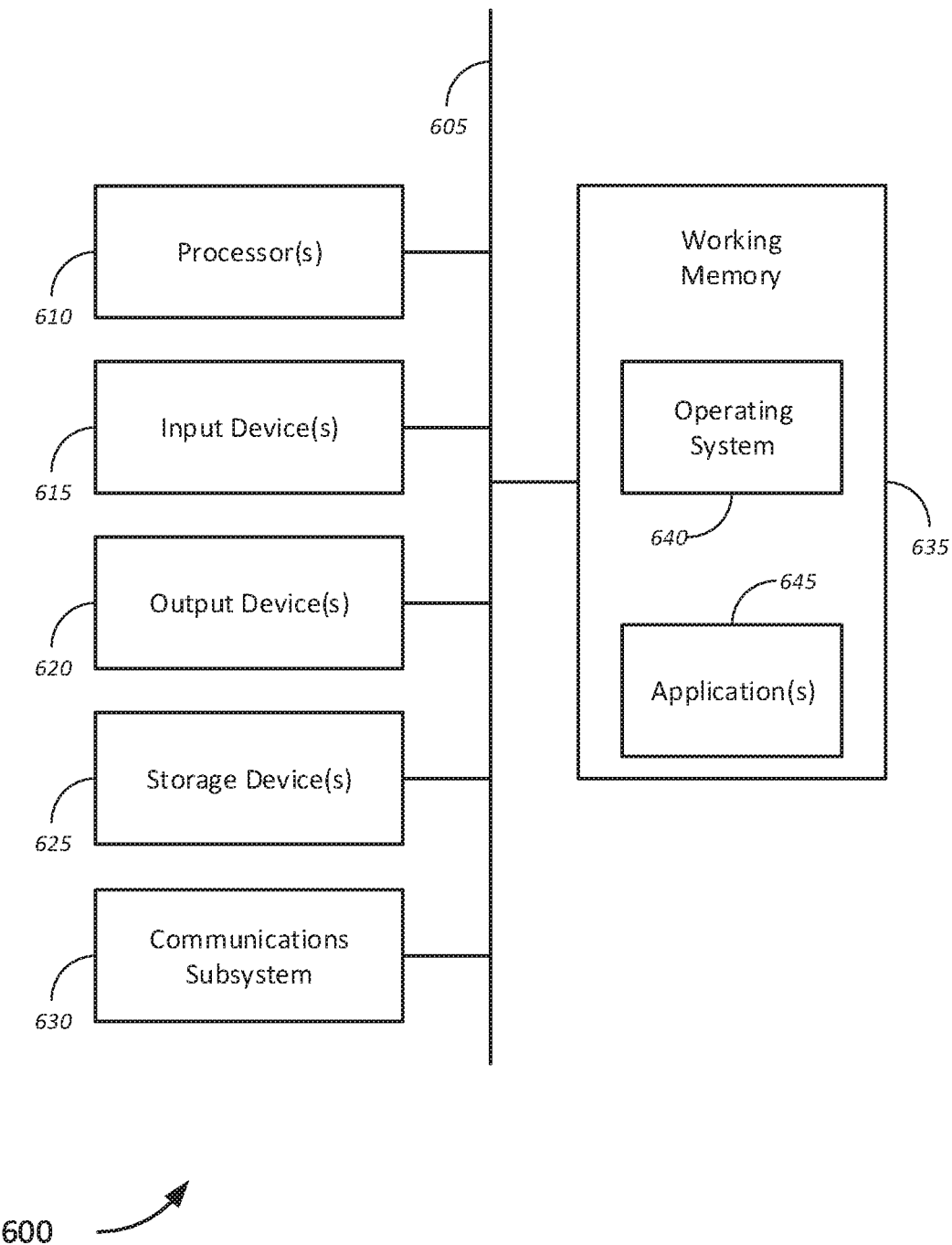
FIG. 6 is a schematic block diagram of a computer system for point-to-point mesh network deployment, in accordance with various embodiments.

FIG. 6 is a schematic block diagram of a computer system 600 for point-to-point mesh network deployment, in accordance with various embodiments. FIG. 6 provides a schematic illustration of one embodiment of a computer system 600, such as a fiber injection node, dual node, host mesh node, any of the one or more associated transceivers and/or controllers, which may perform the methods provided by various other embodiments, as described herein. It should be noted that FIG. 6 only provides a generalized illustration of various components, of which one or more of each may be utilized as appropriate. FIG. 6, therefore, broadly illustrates how individual system elements may be implemented in a relatively separated or relatively more integrated manner.

The computer system 600 includes multiple hardware elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and microcontrollers); one or more input devices 615, which include, without limitation, a mouse, a keyboard, one or more sensors, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 might also include a communications subsystem 630, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or a LP wireless device as previously described. The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments (including, without limitation, various applications running on the various server, LP wireless device, control units, and various secure devices as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
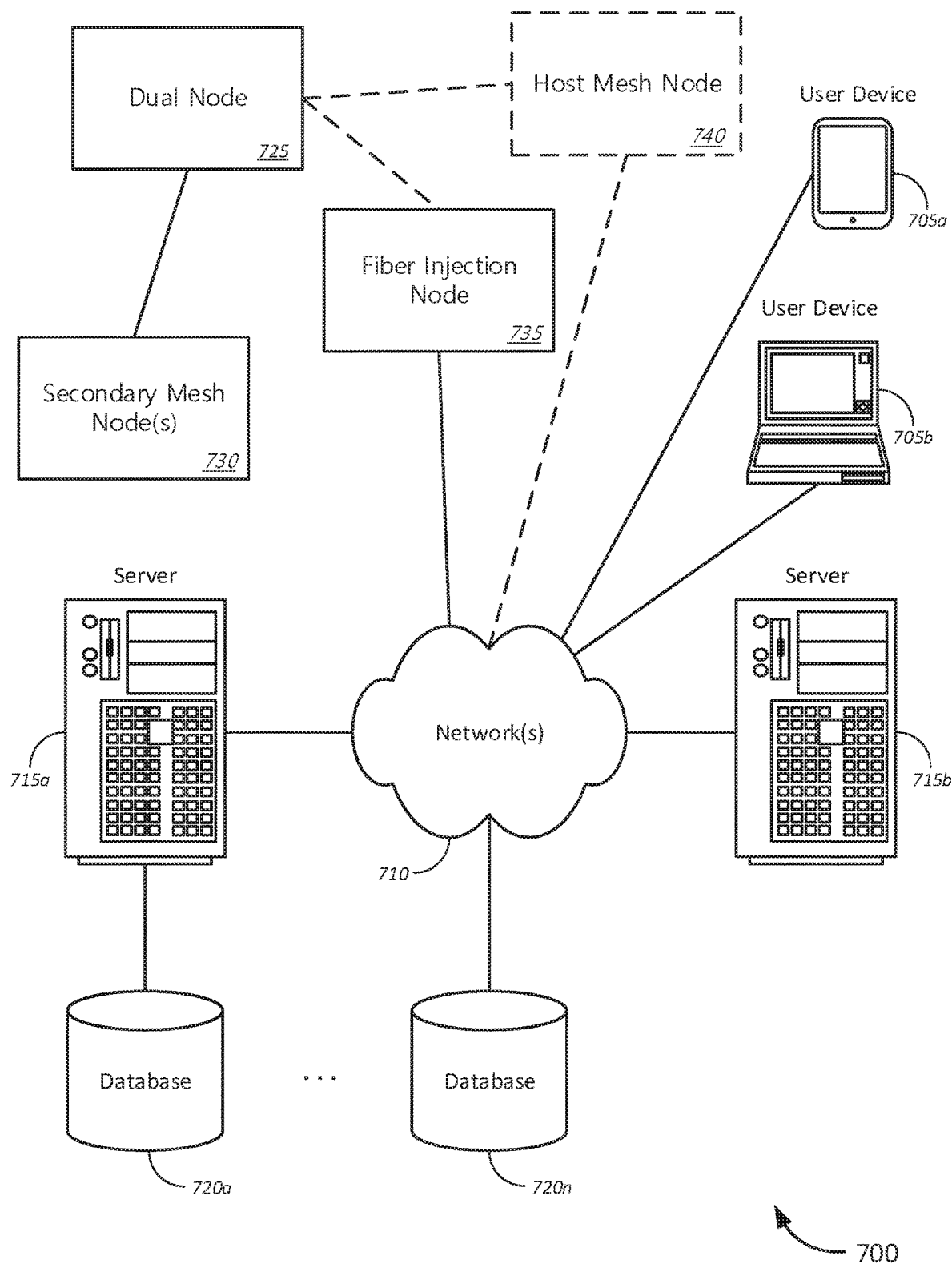
FIG. 7 is a block diagram illustrating a networked system of computing systems, which may be used in accordance with various embodiments.

FIG. 7 is a block diagram illustrating a networked system of computing systems, which may be used in accordance with various embodiments. The system 700 may include one or more user devices 705. A user device 705 may include, merely by way of example, desktop computers, single-board computers, tablet computers, laptop computers, handheld computers, and the like, running an appropriate operating system, which in various embodiments may include various CPE, dual nodes, secondary mesh nodes, and/or tertiary CPE nodes as previously described. User devices 705 may further include external devices, remote devices, servers, and/or workstation computers running any of a variety of operating systems. In some embodiments, the operating systems may include commercially-available UNIX™ or UNIX-like operating systems. A user device 705 may also have any of a variety of applications, including one or more applications configured to perform methods provided by various embodiments, as well as one or more office applications, database client and/or server applications, and/or web browser applications. Alternatively, a user device 705 may include any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user devices 705, any number of user devices 705 may be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, management network, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications, programs, web-based services, or other network resources accessible by a client. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715*a* (or alternatively, user device 705). Alternatively, a database 720*n* can be remote from any or all of the computers of system 700 so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers of the system 700 can be stored locally on the respective computer and/or remotely, as appropriate.) In one set of embodiments, the database 720 may be a relational database configured to host one or more data lakes collected from various data sources, such as the managed object 725, user devices 705, or other sources. Relational databases may include, for example, an Oracle database, that is adapted to store, update, and retrieve data in response to SQL-formatted commands. The database might be controlled and/or maintained by a database server.

The system 700 may further include a dual node 725, secondary mesh node 730, fiber injection node 735, and host mesh node 740. Each of the fiber injection node 735 and host mesh node 740 may be coupled to the network 710. The dual node 725 may be coupled to the fiber injection node 735 via a point-to-point wireless connection as previously described. The point-to-point wireless connection may, in various embodiments, be a wireless backhaul connection configured to transmit traffic from one or more secondary mesh nodes 730, and one or more tertiary CPE nodes (not shown) coupled to the dual node 725 and/or respective secondary mesh nodes 730. Accordingly, the dual node 725 may further be configured to establish a mesh wireless connection to each of the one or more secondary mesh nodes 730 and any tertiary CPE nodes, as previously described.

In various embodiments, once a critical mass of customers have been provisioned in a service area, the dual node 725 may be configured to establish a mesh wireless backhaul connection to the host mesh node 740. As previously described, in some embodiments, the mesh wireless backhaul connection may be established, alternatively, via one or more secondary mesh nodes 730 and/or tertiary CPE nodes (not shown). In some embodiments, the point-to-point wireless connection between the dual node 725 and fiber injection node 735 may be disconnected and the fiber injection node 735 may be removed and reinstalled at a different service area.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   an aggregation node comprising a host wireless transceiver, wherein the aggregation node is coupled to a service provider network;
   a first node associated with a first customer premises, the first node comprising:
   a remote wireless transceiver in communication with the host wireless transceiver;
   a processor; and
   non-transitory computer readable media comprising instructions executable by the processor to:
   establish, via a first mesh network node transceiver, a mesh connection to a secondary mesh network node associated with a second customer premises;
   provision, via the mesh connection, access to the service provider network to the second customer premises;
   receive, via the mesh connection, a first data from the second customer premises; and
   transmit, via a point-to-point wireless connection, the first data from the second customer premises to the service provider network.

2. The system of claim 1, wherein the instructions are further executable by the processor to:
   receive, via the point-to-point wireless connection, a second data from the service provider network; and
   transmit, via the mesh connection, the second data from the service provider network to the second customer premises.

3. The system of claim 1, wherein the system further comprises a host mesh radio, the host mesh radio is coupled to the service provider network, wherein the instructions are further executable by the processor to:
   establish, via the first mesh network node transceiver, a backhaul connection to the host mesh radio; and
   provision, via the backhaul connection, access to the service provider network.

4. The system of claim 3, wherein the instructions are further executable by the processor to:
   disconnect, via the remote wireless transceiver, the point-to-point wireless connection in response to the backhaul connection being established.

5. The system of claim 3, wherein the instructions are further executable by the processor to:
   conduct, via the backhaul connection, one or more communications associated with the second customer premises over the backhaul connection.

6. The system of claim 3, wherein the instructions are further executable by the processor to:

establish, via the first mesh network node transceiver, a new subscriber connection to a new subscriber premises, wherein the new subscriber connection is one of a second mesh connection, or a connection established through the mesh connection to a second mesh network node; and provision, via the backhaul connection, access to the service provider network to the new subscriber, wherein communication with the new subscriber is carried over the new subscriber connection.

7. The system of claim 3, wherein the host mesh radio is coupled to the service provider network via a fiber optic line.

8. The system of claim 1, wherein the point-to-point wireless connection is a millimeter wave wireless connection.

9. The system of claim 1, wherein the aggregation node is coupled to the service provider network via a fiber optic line.

10. An apparatus comprising:
a remote wireless transceiver;
a mesh network node transceiver;
a processor; and
non-transitory computer readable media comprising instructions executable by the processor to:
establish, via the mesh network node transceiver, a mesh connection to a mesh network node associated with a customer premises;
provision, via the mesh connection, access to a service provider network to the customer premises;
receive, via the mesh connection, a first data from the customer premises; and
transmit, via a point-to-point wireless connection, the first data from the customer premises to the service provider network.

11. The apparatus of claim 10, wherein the instructions are further executable by the processor to:
receive, via the point-to-point wireless connection, a second data from the service provider network; and
transmit, via the mesh connection, the second data from the service provider network to the second customer premises.

12. The apparatus of claim 10, wherein the instructions are further executable by the processor to:
establish, via the mesh network node transceiver, a backhaul connection to a host mesh radio in communication with the service provider network; and
provision, via the backhaul connection, access to the service provider network.

13. The apparatus of claim 12, wherein the instructions are further executable by the processor to:
disconnect, via the remote wireless transceiver, the point-to-point wireless connection in response to the backhaul connection being established.

14. The apparatus of claim 12, wherein the instructions are further executable by the processor to:
conduct, via the backhaul connection, one or more communications associated with the second customer premises over the backhaul connection.

15. The apparatus of claim 12, wherein the instructions are further executable by the processor to:
establish, via the first mesh network node transceiver, a new subscriber connection to a new subscriber premises, wherein the new subscriber connection is one of a second mesh connection, or a connection established through the mesh connection to a second mesh network node; and
provision, via the backhaul connection, access to the service provider network to the new subscriber, wherein communication with the new subscriber is carried over the new subscriber connection.

16. The apparatus of claim 10, wherein the point-to-point wireless connection is a millimeter wave wireless connection.

17. A method comprising:
establishing, via a first mesh network node transceiver, a mesh connection to a secondary mesh network node associated with a customer premises;
provisioning, via the mesh connection, access to a service provider network to the customer premises;
receiving, via the mesh connection, a first data from the customer premises; and
transmitting, via a point-to-point wireless connection, the first data from the customer premises to the service provider network.

18. The method of claim 17 further comprising:
receiving, via the point-to-point wireless connection, a second data from the service provider network; and
transmitting, via the mesh connection, the second data from the service provider network to the second customer premises.

19. The method of claim 17 further comprising:
establishing, via the first mesh network node transceiver, a backhaul connection to a host mesh radio in communication with the service provider network;
provisioning, via the backhaul connection, access to the service provider network; and
disconnecting, via a remote wireless transceiver, the point-to-point wireless connection in response to the backhaul connection being established.

20. The method of claim 19 further comprising:
establishing, via the first mesh network node transceiver, a new subscriber connection to a new subscriber premises, wherein the new subscriber connection is one of a second mesh connection, or a connection established through the mesh connection to the second mesh network node; and
provisioning, via the backhaul connection, access to the service provider network to the new subscriber, wherein communication with the new subscriber is carried over the new subscriber connection.

\* \* \* \* \*